(No Model.) 2 Sheets—Sheet 1.

U. C. ALLEN & N. S. POTTER.
APPARATUS FOR SEPARATING VEGETABLE FROM ANIMAL FIBER.

No. 356,611. Patented Jan. 25, 1887.

Witnesses:
Phil C. Dietrich
A. E. Dowell

Inventors:
Uriah C. Allen,
Newsome S. Potter,
by J. H. Alexander
Attorney.

(No Model.) 2 Sheets—Sheet 2.

U. C. ALLEN & N. S. POTTER.
APPARATUS FOR SEPARATING VEGETABLE FROM ANIMAL FIBER.

No. 356,611. Patented Jan. 25, 1887.

Witnesses:
Phil C. Dieterich
A. E. Dowell

Inventors:
Ulrich C. Allen
Newsome S. Potter
by J. S. Alexander
Attorney.

UNITED STATES PATENT OFFICE.

U. CORNELL ALLEN AND NEWSOME SCOTT POTTER, OF SANDY HILL, N. Y.

APPARATUS FOR SEPARATING VEGETABLE FROM ANIMAL FIBER.

SPECIFICATION forming part of Letters Patent No. 356,611, dated January 25, 1887.

Application filed August 23, 1886. Serial No. 211,678. (No model.)

*To all whom it may concern:*

Be it known that we, URIAH CORNELL ALLEN and NEWSOME SCOTT POTTER, of Sandy Hill, in the county of Washington and State of New York, have invented certain new and useful Improvements in Machines for Separating Vegetable from Animal Fiber by Acids; and we do hereby declare that the following is a full, clear, and exact description of the invention, reference being had to the accompanying drawings, and to the letters of reference marked thereon, which form part of this specification, in which—

Figure 1:
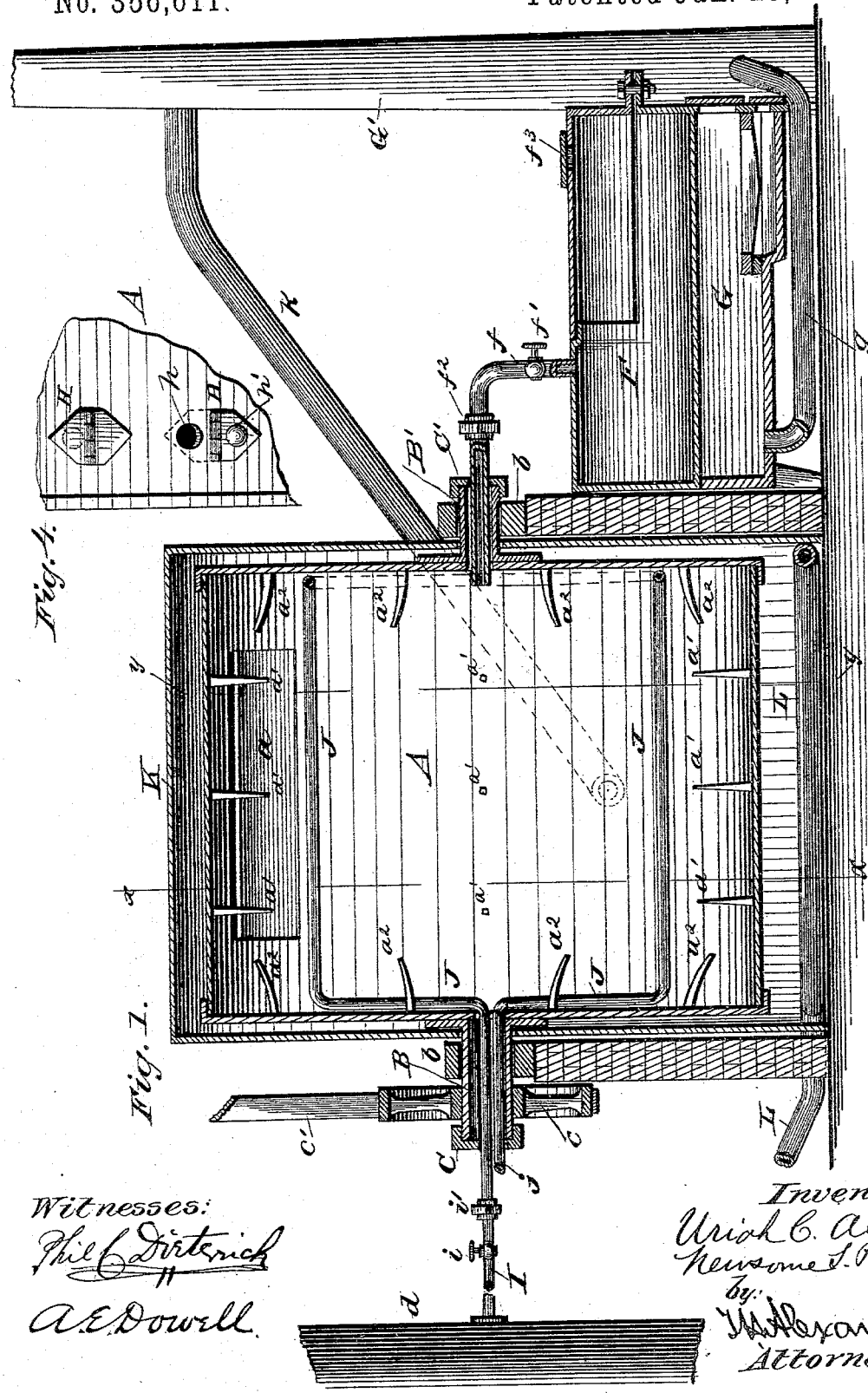
Figure 2:
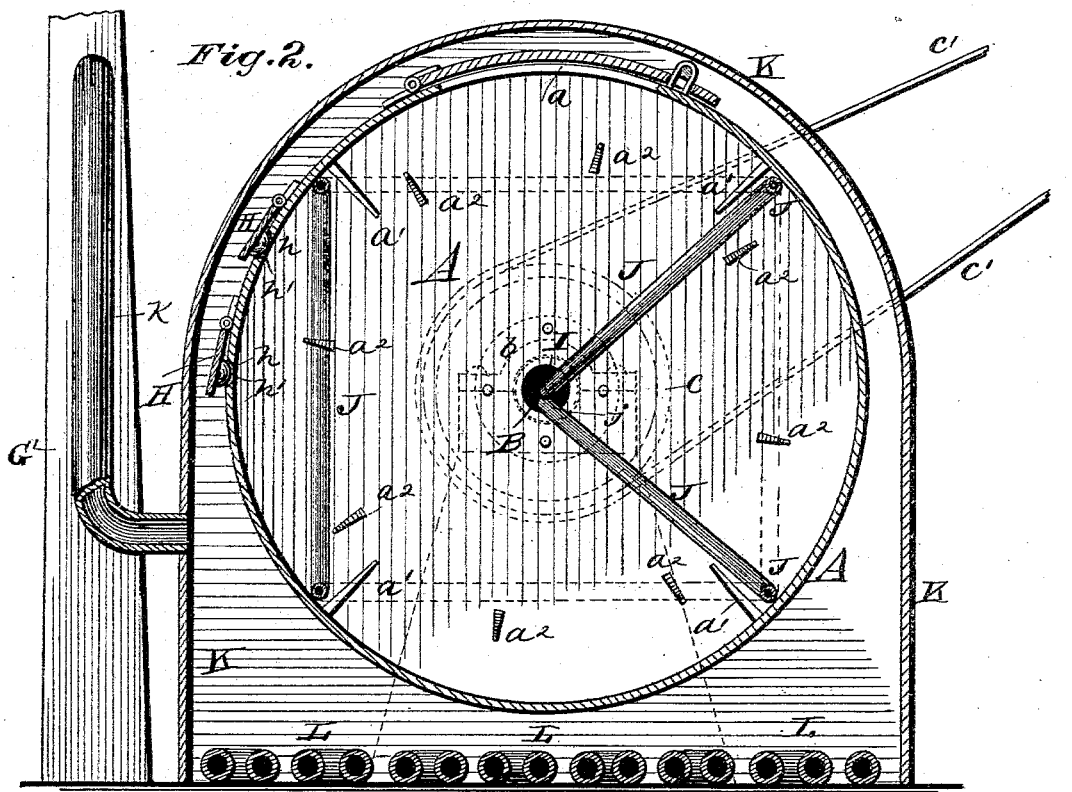
Figure 3:
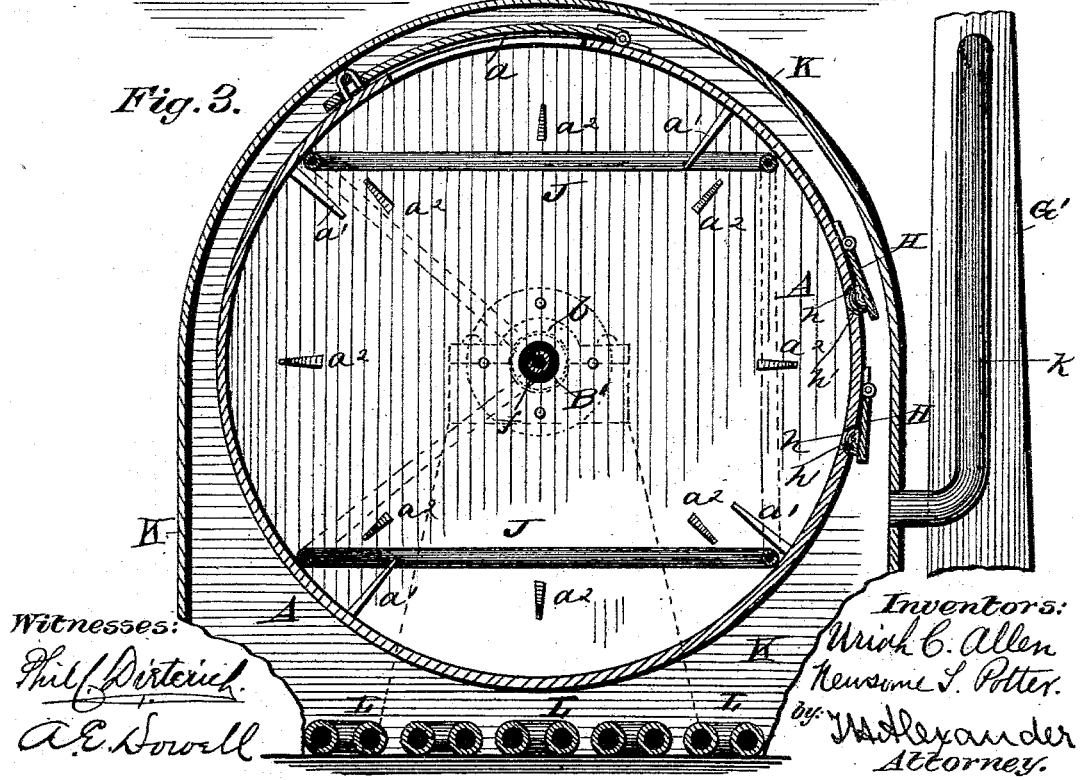

Figure 1 represents a vertical longitudinal sectional view. Fig. 2 is a transverse vertical section on line $x\ x$, Fig. 1. Fig. 3 is a similar view on line $y\ y$, Fig. 1. Fig. 4 represents a detail view.

This invention relates to improvements in machines for removing cotton and other vegetable matter from wool and silk, or similar animal fiber, the removal being effected by the use of hydrochloric or other suitable acid.

The invention consists mainly in the construction and arrangement of the parts whereby the gaseous acid is admitted to and exhausted from a rotating drying-cylinder forming part of the machine, and of the parts whereby the material is agitated within the said cylinder while being steam-dried therein.

It further consists in certain details of construction hereinafter described, and pointed out in the appended claims.

Referring to the accompanying drawings, A designates a rotary drum or cylinder, having the door $a$ on its side, preferably hinged over its opening, and closed by a suitable device.

$a'\ a'$ are pins or fingers standing radially inward from the sides of the cylinder, and arranged preferably on longitudinal lines.

$a^2\ a^2$ are similar fingers standing inward from the ends of the cylinder, but inclined outward from base to point, for a purpose hereinafter explained. The said fingers are preferably arranged in circular rows, concentric with the axis of the cylinder.

B B' are bosses secured centrally to the ends of the cylinder, and forming journals for the same. The said journals turn in proper bearings $b\ b$, secured to any suitable support, as shown.

C C' are stuffing-boxes attached to the ends of the journals B B, respectively, and turning therewith.

$c\ c$ is a pulley on the journal B, by means of which and a belt, $c'$, the cylinder is rotated by a suitable engine or other motive power; or gearing may be used to rotate the cylinder instead of the pulley and belt, as may be desired.

F is a retort, preferably of cylindrical shape, and $f$ is a pipe rising from the top of the same, bending horizontally and passing axially through the stuffing-box C' and journal B'. The pipe $f$ has a cock or valve, $f'$, and a joint, $f^2$, outside of the stuffing-box, so that the part within the same can rotate therewith. The opening $f^3$, through which the acid is poured into the retort, is in the top of the same, at the end opposite pipe $f$, and is arranged to be closed by an air-tight door, as shown.

G is the fire-box under the outer end of the retort, and $g$ is a pipe running under the latter to convey the smoke and other products of combustion to the vertical chimney G'.

$h\ h$ are openings for the escape of the moisture and acid-gas from the stock in the cylinder. The said openings are circular, and are made at suitable points in the side of the cylinder, near the ends of the same. The openings $h$ are closed by valves or doors H, each of which has a semi-spherical boss, $h'$, which enters and fits in the corresponding opening as the cylinder rotates.

I is a steam-pipe running from the boiler $d$ of the engine and passing axially through the stuffing-box C and the journal B. The said pipe has the cock or valve $i$ and joint $i'$ on it, outside the stuffing-box, so that the part inside the latter can turn with the same. The said steam-pipe forms a system of coils or return-bends, J J, on the inside surface of the side and ends of the cylinder, and then passes out through the stuffing-box and journal, constituting a steam-discharge pipe, $j$, opening into the air or into a suitable receptacle, to convey it away. The coils J may be arranged within the cylinder in any desired manner.

K is a casing or housing surrounding the cylinder, and provided with proper openings in its ends for the passage of the journals of the same.

$k$ is a pipe extending from the said casing and connecting with the chimney G'.

L L are return-bend steam-coils lying on the floor of casing K below the cylinder, and proceeding from the boiler of the engine.

The stock is introduced within the cylinder through the door $a$, the upper part of the casing or the whole being removed from around the cylinder to permit this. The cylinder is then rotated, carrying the stock with it, and the fingers $a'$ $a^2$ tearing and loosening it while the cylinder rotates. The valve $f'$ being then opened, the gaseous acid flows in, fills the cylinder, destroying in the usual well-known manner the vegetable matter in the stock. The steam passing through the coils J dries the stock and removes the moisture therefrom, and the gaseous acid passes through the openings $h$ into the space between the cylinder and casing, when they are drawn through pipe $k$ and up the chimney G' by the draft of the latter. The valves H automatically open and close alternately as the cylinder rotates. The end fingers, $a^2$, being bent outward, throw the rotating stock toward the center of the cylinder and upon the fingers $a'$, thereby producing a more perfect disintegration of the same in a shorter time.

By means of the automatically opening and closing of valves H the acid-gas is retained within the cylinder a short time, and then, with the moisture from the drying stock, escapes at regular intervals of time therefrom. This greatly facilitates the drying, so that a much larger amount of stock can be treated per day than by the processes now in use, at much less expense, and at the same time preserving all the fulling qualities of the wool.

By the arrangement of the steam-coils within the cylinder a great economy of heat is effected.

The machine is also useful in separating burrs and particles of woody and grassy fiber from loose wool. This would be one of the main uses to which it would be applied. It can also be used in the treatment of woolen waste mixed with cotton.

Having described our invention, what we claim, and desire to secure by Letters Patent, is—

1. In a machine to remove the vegetable matter from animal fiber, a rotary drying-cylinder provided with longitudinal rows of inwardly-extending teeth or fingers on the inner surface of its sides, and on the inner surface of its ends with fingers extending inwardly and toward the sides of the cylinder, to throw the stock inwardly on the side fingers when the cylinder is in action, substantially as specified.

2. In a machine to remove vegetable matter from animal fiber, the combination, with a rotary drying-cylinder, A, of the inwardly-extending fingers $a'$, arranged in longitudinal rows on the sides of the cylinder, and the fingers $a^2$, extending inwardly from the ends and toward the sides of the cylinder and arranged in one or more circular rows concentric with the axis of the same, substantially as specified.

3. In a machine to remove the vegetable matter from animal fiber, the combination of the rotary drying-cylinder provided with distributing and disintegrating fingers, a retort to volatilize the acid, the valve-controlled pipe passing from said retort axially through one of the journals of the drying-cylinder and provided with a joint, so that the section in said journal can rotate therewith, and the valve H, provided with hemispherical bosses to automatically close at regular intervals the corresponding openings in the side of the shell of the cylinder, substantially as specified.

4. The combination of the rotary drying-cylinder, the steam-drying coils arranged on the inner surface thereof, the acid-volatilizing retort, the pipe passing axially through one of the journals of the cylinder, the valves on the sides of the cylinder, and provided with the hemispherical bosses to automatically close corresponding openings in the cylinder, the casing K, surrounding the cylinder, the escape-pipe $k$, and the chimney G', substantially as specified.

5. The combination, with a rotary drying-cylinder, of the steam-coils J, arranged on the inner surface thereof, the steam-pipe I, provided with the valve $i$ and joint $i'$ and passing axially through the journal B and stuffing-box C, and the escape-pipe $j$, passing through said journal and box to one side of the steam-pipe, substantially as described.

6. The herein-described machine to remove vegetable matter from animal fiber by means of a gaseous acid, consisting of the rotary drying cylinder having escape-orifices in its side and valves to automatically open and close said orifices alternately as the cylinder rotates, the retort communicating with the cylinder by means of a pipe running axially through the journal on one of its ends, the steam-coils arranged on the inner surface of the cylinder, the steam-pipe and discharge-pipe for said coils, passing through the journal opposite that through which the retort-pipe passes, and means, substantially as specified, whereby the cylinder is rotated.

In testimony that we claim the foregoing as our own we affix our signatures in presence of two witnesses.

U. CORNELL ALLEN.
NEWSOME SCOTT POTTER.

Witnesses:
HARLEY CUSHMAN,
CHARLES R. PARIS.